United States Patent [19]

Regazzi

[11] Patent Number: 4,589,443
[45] Date of Patent: May 20, 1986

[54] GAS BOTTLE VALVE INCORPORATING A GAS BLEED-OUT DEVICE, PARTICULARLY FOR USE ON GAS OPERATED MOTOR VEHICLE

[75] Inventor: Renzo Regazzi, Trebbo di Reno, Italy

[73] Assignee: O.M.V.L. s.r.l., Trebbo di Reno, Italy

[21] Appl. No.: 627,996

[22] Filed: Jul. 5, 1984

[30] Foreign Application Priority Data

Jul. 15, 1983 [IT] Italy ................................ 4947/83[U]

[51] Int. Cl.[4] ............................................. F16K 24/00
[52] U.S. Cl. .................................... 137/588; 137/886; 222/3; 285/45
[58] Field of Search .......................... 222/108, 109, 3; 137/588, 886, 872; 285/15, 45, 355

[56] References Cited

U.S. PATENT DOCUMENTS

| | | | |
|---|---|---|---|
| 977,261 | 11/1910 | Bernstein | 137/588 |
| 1,427,854 | 9/1922 | Rogers | 222/3 |
| 2,260,500 | 10/1941 | Wylie | 285/45 |
| 2,780,071 | 2/1957 | Calva | 137/886 |
| 3,058,719 | 10/1962 | Beebee | 137/588 |
| 3,759,291 | 9/1973 | Moure et al. | 137/588 |

*Primary Examiner*—A. Michael Chambers
*Attorney, Agent, or Firm*—Guido Modiano; Albert Josif

[57] ABSTRACT

Gas bottle valve incorporating a gas bleed-out device, particularly for use on gas operated motor vehicles, with a body having a gas delivery conduit of substantially T-like configuration. The conduit is provided at ends of respective coaxial branches with threaded fittings for gas delivery lines and opening, via a crosswise branch to the former.

1 Claim, 4 Drawing Figures

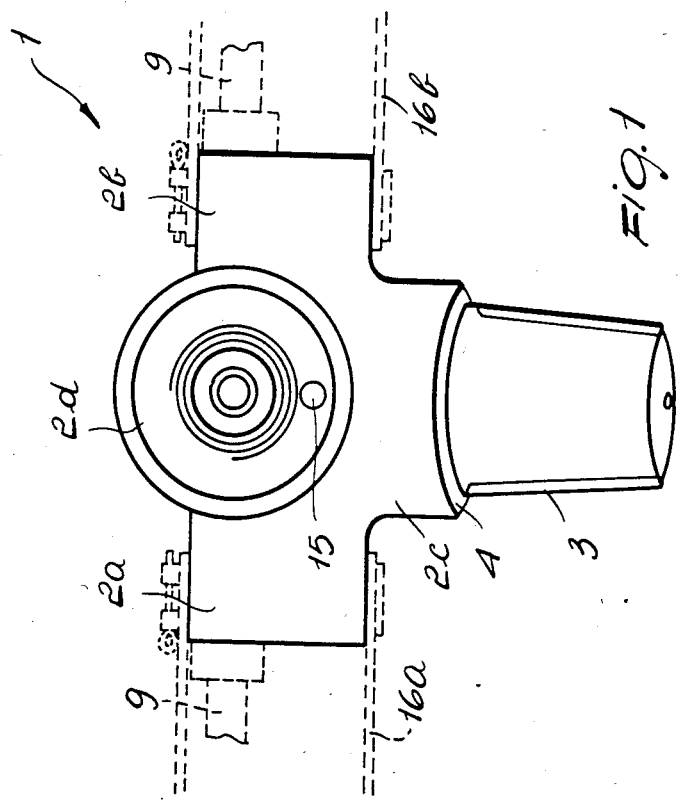
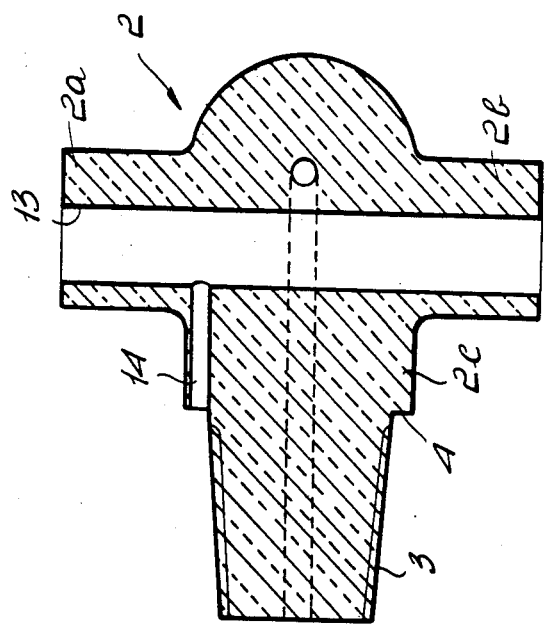

4,589,443

GAS BOTTLE VALVE INCORPORATING A GAS BLEED-OUT DEVICE, PARTICULARLY FOR USE ON GAS OPERATED MOTOR VEHICLE

BACKGROUND OF THE INVENTION

This invention relates to a gas bottle valve incorporating a gas bleed-out device, particularly for use on gas operated motor vehicles.

As is known, the installation of gas bottles on gas operated motor vehicles, in particular methane gas operated motor vehicles, either requires that the vehicle passenger compartment be isolated from the gas bottles, or that the gas bottles be connected to respective valves on the exterior of the vehicle via bleed-out lines, in order to ensure that any gas leaks past the valves cannot form gas pockets within the vehicle.

SUMMARY OF THE INVENTION

It is an object of this invention to provide a valve incorporating a gas bleed-out device suitable to direct outside the vehicle, any gas leaking past the valve itself or the bottle fitting.

A further object of the invention is to provide such a valve which is of simple design, reliable in operation, versatile in application, and of relatively low cost.

These objects are achieved, according to the invention, by this gas bottle valve incorporating a gas bleed-out device, particularly for use on gas operated motor vehicles, characterized in that it comprises a body having a gas delivery conduit formed therein of substantially T-like configuration, said conduit being provided at the ends of respective coaxial branches with threaded fittings for gas delivery lines and opening, via a crosswise branch to the former, axially into a threaded fitting on said gas bottle and defining a tubular portion the hollow whereof is in communication with the area of intersection of said branches of the gas delivery conduit and forms a seat for valve shutter members, said tubular portion being shut off by a socket-like operating knob, said body being further provided with a bleed hole extending parallel to said coaxial branches of said delivery conduit and in communication with a cross hole opening at an annular shoulder defined by said body at the base of said bottle fitting, and with an additional bleed hole extending longitudinally to said tubular portion and in communication with said bleed hole.

BRIEF DESCRIPTION OF THE DRAWINGS

The invention details will be apparent from the following description of a preferred embodiment of this valve incorporating a gas bleed-out device, with reference to the accompanying illustrative drawings, where:

FIG. 1 is a front view of this valve;

FIG. 4 is a sectional view taken along the line IV—IV of FIG. 2.

DESCRIPTION OF THE PREFERRED EMBODIMENTS

Figure 3:
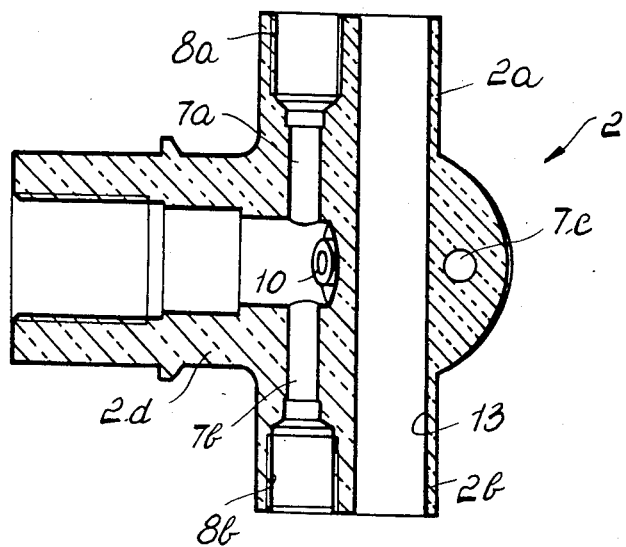
FIG. 3 is a sectional view taken along the line III—III of FIG. 2.
Figure 2:
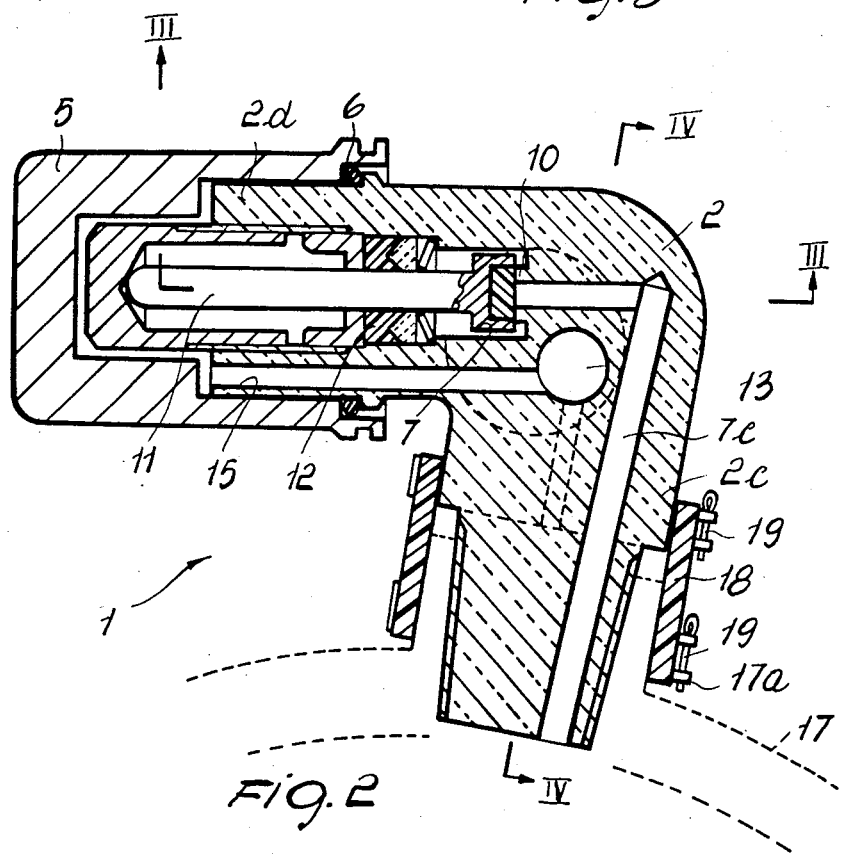
FIG. 2 is a longitudinal midsection view.

With reference to the drawing views, generally indicated at 1 is a valve intended for installation on a gas bottle for automobile applications. The valve 1 has a body 2 of substantially T-like configuration, which comprises cylindrical coaxial sections 2a,2b extending symmetrically across a section 2c which defines axially a threaded fitting 3 of frustum-like configuration adapted for connection to a corresponding threaded seat in the gas bottle. An annular shoulder 4 is defined between said section 2c and fitting 3.

Transversely to the plane defined by the sections 2a,2b,2c, the body 2 defines a tubular portion 2d which forms a seat for the valve shutter members, of a substantially known type no further described herein. Mounted on the tubular portion 2d is an actuating knob 5 of socket-like configuration which is sealed by means of an annular seal 6.

The body 2 of the valve has formed in its interior a gas delivery conduit 7, also of T-like configuration through respective branches 7a,7b,7c extending lengthwise to the sections 2a,2b,2c, respectively, of said body. The branches 7a,7b have at their ends threaded female fittings 8a,8b for suitable gas delivery pipes 9.

At the intersection area of the branches 7a,7b with the branch 7c of the gas delivery conduit, there is defined the front closure seat 10 of the valve shutter 11: an annular seal 12 is arranged to make a seal against the shutter 11 which is mounted inside the tubular portion 2d, the holow whereof is in communication with said intersection area of the branches 7a,7b,7c of the gas delivery conduit. Formed on one side of the branches 7a,7b of the gas delivery conduit and through the body 2 of the valve is a bleed hole 13 of large cross-sectional area. A crosshole 14 opening at the end at the shoulder 4 is in communication with the bleed hole 13.

A further bleed hole 15 is formed lengthwise to the tubular portion 2d of the body 2, which hole opens, in turn, into the bleed hole 13.

Adapted for clamping onto the sections 2a,2b of the valve body are respective bleed pipes 16a,16b in communication with the exterior of the vehicle in a known manner.

The holes 13,14 and 15 act as a bleed-out device for any leaking gas, in association with the bleed pipes 16a,16b. In fact, once the valve 1 is mounted to the fitting 17a of a bottle 17 the outward seal of the joint is ensured by means of a sleeve seal 18 held tightly by suitable straps 19, any minor leaks past the threaded connection 3–17a are led, at the shoulder 4, to the bleed hole 13–14 which opens into the bleed pipes 16a,16b connecting the valve to the exterior of the vehicle.

A second possibility for leaks could occur inside the valve itself, owing to a faulty seal formed by the seal 12 and consequent seepage past the internal thread of the tubular portion 2d. Such a leak would be led to the further bleed hole 15 which, in turn, opens into the hole 13. It should be emphasized that to prevent propagation of that leak out of the valve, the knob 5 is provided with a gasket 6.

Another possibility for an imperfect seal and hence, the occurence of leaks, may happen at the connection between the fittings of the delivery pipes 9 to the valve itself, but in this case the leaking gas would be conveyed directly to the exterior of the vehicle via the bleed pipes 16a,16b.

The valve 1 has two threaded fittings 8a,8b to allow connection of two gas bottles, where contemplated. When not used, one of said fittings is closed by means of an appropriate threaded plug.

In practicing the invention, any suitable materials, shapes and dimensions may be used to meet individual requirements.

I claim:

1. A gas bottle valve incorporating a gas bleed-out device particularly for use on gas operated motor vehicles, comprising a body of substantially T-like configuration including a threaded section provided with an annular shoulder, for connection to a threaded fitting in the gas bottle, two cylindrical coaxial sections extending symmetrically from said threaded section, and a tubular portion transversally extending to the plane of said sections, a gas delivery conduit of substantially T-like configuration formed in said body and having branches extending along said sections, the branches extending along said coaxial sections having threaded ends for receiving gas delivery pipes, a valve shutter means arranged in said tubular portion and controlling said gas delivery conduit, wherein according to the improvement said shutter means include a socket-like knob tightly sealing said tubular portion, the valve further comprising a first bleed hole extending through said coaxial sections and open to the opposite ends thereof, a second bleed hole formed lengthwise in the tubular portions and connecting said first bleed hole with said socket-like knob, a cross bleed hole connected with said first bleed hole and opening at said annular shoulder, a sleeve tightly held on said threaded section of the body and on the threaded fitting in the gas bottle, and bleed pipes tightly associated onto said coaxial sections and in communication with the exterior of the vehicle.

* * * * *